US008371533B2

(12) United States Patent
Tichborne et al.

(10) Patent No.: US 8,371,533 B2
(45) Date of Patent: Feb. 12, 2013

(54) AIRCRAFT AUXILIARY FUEL TANK SYSTEM AND METHOD

(75) Inventors: Franklin George Tichborne, Bristol (GB); Kim Michael Ley, Bristol (GB)

(73) Assignee: Airbus Operations Limited, Bristol (GB)

( * ) Notice: Subject to any disclaimer, the term of this patent is extended or adjusted under 35 U.S.C. 154(b) by 1243 days.

(21) Appl. No.: 12/158,061

(22) PCT Filed: Dec. 1, 2006

(86) PCT No.: PCT/GB2006/004501
§ 371 (c)(1),
(2), (4) Date: Jun. 19, 2008

(87) PCT Pub. No.: WO2007/071909
PCT Pub. Date: Jun. 28, 2007

(65) Prior Publication Data

US 2008/0272237 A1 Nov. 6, 2008

(30) Foreign Application Priority Data

Dec. 22, 2005 (GB) .................................. 0526209.2

(51) Int. Cl.
*B64D 37/00* (2006.01)

(52) U.S. Cl. .................................................. 244/135 R

(58) Field of Classification Search ............. 244/135 R, 244/135 A–135 C, 172.3, 172.2, 169, 164; 74/114.54; 220/564
See application file for complete search history.

(56) References Cited

U.S. PATENT DOCUMENTS 4,790,350 A * 12/1988 Arnold ..................... 244/135 B
(Continued)

FOREIGN PATENT DOCUMENTS

DE 102004021096 A1 12/2005
EP 0850796 A2 7/1998
(Continued)

OTHER PUBLICATIONS

ISR and Written Opinion for PCT/GB2006/004501 dated Mar. 27, 2007.

(Continued)

*Primary Examiner* — Tien Dinh
*Assistant Examiner* — Richard R Green
(74) *Attorney, Agent, or Firm* — Lowe Hauptman Ham & Berner, LLP

(57) ABSTRACT

One or more main aircraft fuel tanks are provided with one or more fuel gauges arranged to provide a measure of the amount of fuel in said one or more main fuel tanks. One or more auxiliary fuel tanks are also provided. The aircraft uses fuel during a first phase of fuel consumption, upon commencement of which phase the auxiliary fuel tanks hold fuel. After the first phase said one or more auxiliary fuel tanks are empty and a second phase commences. During the first phase, an indication of the amount of fuel carried by the aircraft is provided by means of summing (i) the amount of fuel in the main fuel tanks as measured by said one or more fuel gauges and (ii) the amount of fuel remaining in said one or more auxiliary fuel tanks as calculated using a measure relating to the fuel consumption rate. During the second phase of fuel consumption, an indication of the amount of fuel carried by the aircraft is provided on the basis of the amount of fuel measured by said one or more fuel gauges.

11 Claims, 4 Drawing Sheets

U.S. PATENT DOCUMENTS 5,186,138 A * 2/1993 Hashimoto ............ 123/198 DB
6,002,328 A * 12/1999 Wallrafen .................. 340/450.2
6,424,924 B1 7/2002 Wagner et al.
6,491,255 B1 12/2002 Bracken et al.
2004/0149003 A1 8/2004 Nestvall

FOREIGN PATENT DOCUMENTS

FR 2710743 A1 4/1995
JP 3-273932 A 12/1991
JP 6-55944 A 3/1994
JP 6-206454 A 7/1994
JP 9-268958 A 10/1997
JP 2000-146668 5/2000
JP 2002-162235 6/2002
RU 2191141 C1 10/2002
WO 99/67103 A2 12/1999
WO 2003/102509 A3 12/2003
WO 2005/079205 A2 9/2005

OTHER PUBLICATIONS

British Search Report for GB0526209.2 dated Apr. 24, 2006.

* cited by examiner

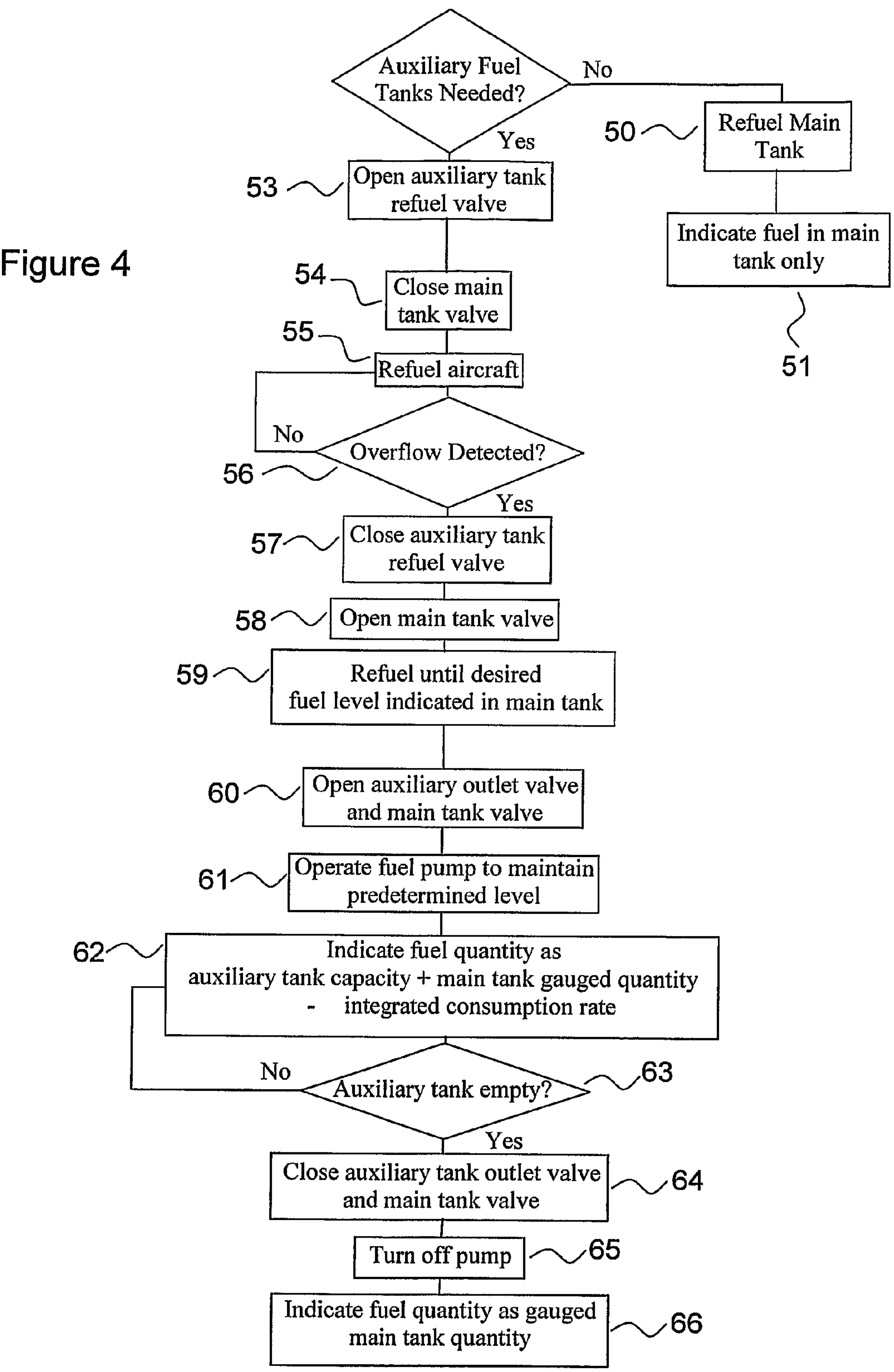
Figure 4
Auxiliary Fuel Tanks Needed?
No
Yes
50
Refuel Main Tank
Indicate fuel in main tank only
51
53
Open auxiliary tank refuel valve
54
Close main tank valve
55
Refuel aircraft
No
Overflow Detected?
56
Yes
57
Close auxiliary tank refuel valve
58
Open main tank valve
59
Refuel until desired fuel level indicated in main tank
60
Open auxiliary outlet valve and main tank valve
61
Operate fuel pump to maintain predetermined level
62
Indicate fuel quantity as auxiliary tank capacity + main tank gauged quantity - integrated consumption rate
No
Auxiliary tank empty?
63
Yes
Close auxiliary tank outlet valve and main tank valve
64
Turn off pump
65
Indicate fuel quantity as gauged main tank quantity
66

AIRCRAFT AUXILIARY FUEL TANK SYSTEM AND METHOD

RELATED APPLICATIONS

The present application is based on International Application Number PCT/GB2006/004501 filed Dec. 1, 2006, and claims priority from British Application Number 0526209.2 filed Dec. 22, 2005, the disclosures of which are hereby incorporated by reference herein in their entirety.

TECHNICAL FIELD

This invention relates to auxiliary fuel tanks for aircraft and a method for monitoring fuel quantities when auxiliary fuel tanks are utilised.

BACKGROUND OF THE INVENTION

Aircraft are generally equipped with fuel tanks located in the wings and centre wing box. These main tanks are typically permanently fitted to the aircraft and are of a rigid construction. The main tanks typically comprise the wing and centre wing box tanks. A multiplicity of fuel gauges are fitted to the main tanks such that the quantity of remaining fuel in the main tanks can be accurately determined, which is important in ensuring safe flight operations. A fuel indicator provides a measurement of the fuel remaining in the tanks that is typically accurate to 1%. The system of fuel gauges utilised ensures that a high integrity system is achieved, having a mean time to failure of greater than $1\times10^9$ hours.

It is possible to fit auxiliary fuel tanks to aircraft to increase the fuel capacity and therefore increase the range of the aircraft. Such auxiliary fuel tanks may be fitted in the fuselage of the aircraft under the flooring, and are often made of flexible material, such as polyurethane, to enable them to be fitted around the structure of the aircraft without the need to dismantle that structure, thereby allowing fitment and removal as required. Auxiliary fuel tanks typically have a capacity of between about 5% and 50% of the main tank capacity.

When operating with auxiliary tanks it is highly desirable to provide a means for indicating the total fuel available, that is, the sum of the fuel in both the main tanks and the auxiliary tanks. This could be achieved by providing fuel gauges on the auxiliary tanks, but the fitment of fuel gauges to the auxiliary tanks would be costly and would add weight to the tanks. Furthermore, such auxiliary gauges might need to be connected to the fuel monitoring system of the aircraft so that a correct indication of the fuel remaining could be displayed, which would further complicate their fitment. Even if gauges were fitted to flexible auxiliary tanks it would be difficult to obtain an accurate measure of the fuel quantity in such tanks due to the flexible nature of the tank and the complex shapes of the tanks.

SUMMARY OF THE INVENTION

The present invention provides a method of operating an aircraft having auxiliary fuel tanks without the requirement of fitting fuel gauges to those fuel tanks.

In particular the invention provides a method of aircraft operation, comprising the steps of:

providing one or more main fuel tanks in which fuel is stored, said one or more main fuel tanks being provided with one or more fuel gauges arranged to provide a measure of the amount of fuel in said one or more main fuel tanks, providing one or more auxiliary fuel tanks in which fuel is stored, the aircraft using fuel during a first phase of fuel consumption, said one or more auxiliary fuel tanks holding fuel upon commencement of the first phase, and said one or more auxiliary fuel tanks being substantially empty of fuel immediately after the first phase, during the first phase of fuel consumption, providing an indication of the amount of fuel carried by the aircraft by means of summing the amount of fuel in said one or more main fuel tanks as measured by said one or more fuel gauges and the amount of fuel remaining in said one or more auxiliary fuel tanks as calculated using a measure relating to the fuel consumption rate, the aircraft using fuel during a second phase of fuel consumption, the second phase commencing immediately after the end of the first phase, said one or more auxiliary fuel tanks remaining substantially empty of fuel during the second phase of fuel consumption, and during the second phase of fuel consumption, providing an indication of the amount of fuel carried by the aircraft, the indication being based on the amount of fuel measured by said one or more fuel gauges.

The auxiliary fuel tanks may be full prior to commencement of the first phase. The method may include a step of filing said one or more auxiliary fuel tanks with fuel. The method may include a step of detecting when said one or more auxiliary fuel tanks are full. The auxiliary fuel tanks being full may be detected by means of detecting fuel flow through an overflow outlet associated with those auxiliary fuel tanks. The overflow outlet may be equipped with a flow detection means (for example a flow meter, a movement sensor or a fuel detector) to detect the presence or absence of fuel in the overflow. The presence or absence of fuel in the overflow may for example be detected by measuring the flow of fuel through the overflow outlet.

During the first phase of fuel consumption fuel may be pumped from the auxiliary fuel tanks to the main fuel tanks.

The quantity of fuel in the main fuel tanks may be maintained at a particular level during the first phase of fuel consumption. For example, the main tanks may be kept substantially full of fuel during the first phase of fuel consumption.

The first phase of fuel consumption is terminated when the auxiliary fuel tanks are empty. The method may include a step of detecting when the auxiliary fuel tanks are empty. Such a step may be conducted by monitoring the pressure at one or more fuel pumps pumping fuel from the auxiliary tanks. A low-pressure measurement may for example be indicative of the auxiliary fuel tanks being empty. The auxiliary fuel tanks being empty may additionally or alternatively be detected by monitoring the fuel consumption rate and the rate of change of fuel quantity in the main tanks. For example, the fuel consumption rate being substantially equal to the rate of change of fuel quantity in the main tanks may be indicative of the auxiliary fuel tanks being empty. A combination of the two methods described above for detecting when the auxiliary fuel tanks are empty may be used.

The measure relating to the fuel consumption rate may simply be equal to the fuel consumption rate as measured. Alternatively, the measure may comprise information from which the fuel consumption rate may be calculated. In such a case the method may include a step in which the fuel consumption rate is calculated.

The fuel remaining in the auxiliary fuel tanks may be determined by subtracting the integral of the fuel consumption rate from the quantity of fuel in the auxiliary fuel tanks at the start of the first phase. The quantity of fuel in the auxiliary fuel tanks at the start of the first phase may be ascertained on the basis that the auxiliary tanks are full at the start of the first phase and the predetermined capacity of the auxiliary tanks. As an alternative, the quantity of fuel in the auxiliary fuel tanks at the start of the first phase may be ascertained by measuring the amount of fuel that has been pumped into the auxiliary fuel tanks when filling the tanks.

The one or more auxiliary fuel tanks may have a fuel holding capacity that is less than that of the main tanks. For example, the fuel able to be held in the auxiliary tanks may be less than 30% and possible less than 20% of the total volume of fuel able to be held in all the fuel tanks of the aircraft.

The auxiliary fuel tanks may be ungauged. However, it is within the scope of the invention for the one or more auxiliary fuel tanks to be provided with one of more fuel gauges. Such auxiliary fuel gauges could for example be used as a backup and to provide approximate indication of the amount of fuel in the auxiliary fuel tanks, possibly to confirm the validity of indirect measurements of the "empty" or "full" status of any or all of the auxiliary tanks.

The present invention also provides a fuel quantity indication method, comprising the steps of during a first phase of aircraft operation, during which phase fuel is held in at least one ungauged fuel tank and at least one gauged fuel tank, calculating the remaining fuel quantity in the ungauged fuel tank by subtracting the integral of the fuel consumption rate from the quantity of fuel in the ungauged tank at the start of the first phase and adding the quantity of fuel in the gauged fuel tank as indicated by the fuel gauges, and displaying the remaining fuel quantity accordingly. The fuel quantity indication method may be so performed that, during a second phase of aircraft operation, during which phase fuel is only held in gauged fuel tanks, the quantity of fuel measured by the fuel gauges is displayed as the remaining fuel quantity.

The present invention further provides a computer system arranged to calculate the amount of fuel carried by an aircraft, during a first phase, while one or more auxiliary fuel tanks hold fuel, the amount of fuel being calculated by means of summing (i) the amount of fuel represented by a first input to the computer system concerning the amount of fuel in one or more main fuel tanks as measured by one or more fuel gauges and (ii) the amount of fuel in the one or more auxiliary fuel tanks as calculated using a previous measure of the amount of fuel in the auxiliary fuel tanks and a second input to the computer system representing the rate of fuel consumption. The amount of fuel as calculated by the computer system may be sent as an output to a display that presents the pilot during flight of an aircraft with an indication of the amount of fuel carried by an aircraft as calculated by the computer system. The computer system may also be arranged to send an output during a second phase concerning the amount of fuel remaining, the output sent being based on the first input. The computer system may be arranged to send a phase-indicating output that indicates whether the output concerning the amount of fuel has been calculated by the computer system during the first phase or during the second phase. The display of the amount of fuel as seen by the pilot may distinguish between the first phase and the second phase. For example, the fuel quantity display may include an indication of the source of the data. The display of the fuel quantity may for example be effected by means of displaying the fuel quantity in a first manner during the first phase and displaying the fuel quantity in a second manner, different from the first manner, during the second phase. For example, the display may be made in different colours. Thus, during operation, the pilot may be able to discern from the computer system whether the fuel quantity displayed is the fuel quantity as calculated during the first phase, and thus of low integrity, or whether the fuel quantity is displayed during the second phase, and thus of high integrity.

The computer system may also be arranged to provide indications of the status of one, some or all of said one or more main fuel tanks and of the status of one, some or all of said one or more auxiliary fuel tanks, the status of each tank for example representing the integrity of the fuel tanks. For example, the status indications may be effected by means of displaying the statuses in colours according to the integrity. Thus, in the case where the amount of fuel carried by the aircraft is itself presented in such a way as to indicate that the fuel tanks in which the fuel is held are collectively to be considered as low integrity, the pilot can ascertain that the status of some of the tanks, for example the main tanks, is actually high integrity.

The computer system may form part of an aircraft's computer system that performs other functions.

The present invention yet further provides an aircraft fuel tank assembly, comprising at least one auxiliary fuel tank, at least one main fuel tank having one or more fuel gauges, and a fuel quantity display apparatus, the assembly being so arranged that while said one or more auxiliary tanks hold fuel, the fuel quantity display apparatus provides an indication of the amount of fuel carried by the aircraft in dependence on the sum of (i) the amount of fuel in said one or more main fuel tanks as measured by said one or more fuel gauges and (ii) the amount of fuel remaining in said one or more auxiliary fuel tanks as calculated using a measure relating to the fuel consumption rate, and while said one or more auxiliary fuel tanks are substantially empty, the fuel quantity display apparatus provides an indication of the amount of fuel carried by the aircraft based on the amount of fuel measured by said one or more fuel gauges.

A processor may be provided to calculate the amount of fuel carried by the aircraft by summing parameters concerning (i) the amount of fuel in said one or more main fuel tanks as ascertained from one or more inputs from said one or more fuel gauges and (ii) the amount of fuel remaining in said one or more auxiliary fuel tanks as calculated by the processor using an input concerning the fuel consumption rate. The amount of fuel remaining in said one or more auxiliary fuel tanks may be calculated in dependence on a parameter concerning the amount of fuel in said one or more auxiliary fuel tanks at a known time in the past. The processor may form part of the computer system of the present invention described herein. One or more flow meters may be provided to measure the fuel consumption rate. The auxiliary fuel tank may comprise an overflow outlet connected such that fuel flowing out of that overflow outlet passes into the main fuel tank.

The present invention also provides an aircraft having an aircraft fuel tank assembly according to the above-described aspect of the invention.

The invention also provides a software product for programming a processor to calculate the amount of fuel carried by an aircraft, the software product having a software module (a) for calculating and outputting a fuel quantity parameter, which represents the amount of fuel remaining during a first phase while one or more auxiliary fuel tanks hold fuel, by means of summing (i) a first parameter concerning the amount of fuel in one or more main fuel tanks as measured by one or more fuel gauges and (ii) a second parameter concerning the amount of fuel in the one or more auxiliary fuel tanks, and (b) for calculating the second parameter using a previous measure of the amount of fuel in the auxiliary fuel tanks and a third parameter concerning the rate of fuel consumption. The software product may include a software module for sending an output to a display device to display an indication of the fuel quantity parameter. The second parameter may be calculated by subtracting from the previous measure of the amount of fuel in the auxiliary fuel tanks an integral of the third parameter over a period starting at an instant equivalent to the instant to which the previous measure of the amount of fuel in the auxiliary fuel tanks relates.

The software module may also be arranged to output a fuel quantity parameter, during a second phase while one or more auxiliary fuel tanks are substantially empty, by means of outputting the first parameter concerning the amount of fuel in one or more main fuel tanks as measured by one or more fuel gauges. The software product may comprise one or a plurality of software modules. For example, one module may perform all of the afore-mentioned functions of the software product.

It will of course be appreciated that various aspects of the invention as described above are interrelated. For example, the computer system of the present invention may comprise a processor programmed with the above-mentioned software product. Therefore features described in relation to one aspect may be incorporated into another and vice versa.

DESCRIPTION OF THE DRAWINGS

An embodiment of the present invention will now be described by way of example with reference to the accompanying drawings, of which:

FIG. 4 shows a flowchart of the method of aircraft operation according to the embodiment.

DETAILED DESCRIPTION

The embodiment of the invention provides a fuel system including un-gauged auxiliary fuel tanks and gauged main fuel tanks and a method of operating an aircraft with such a fuel system.

Figure 1:
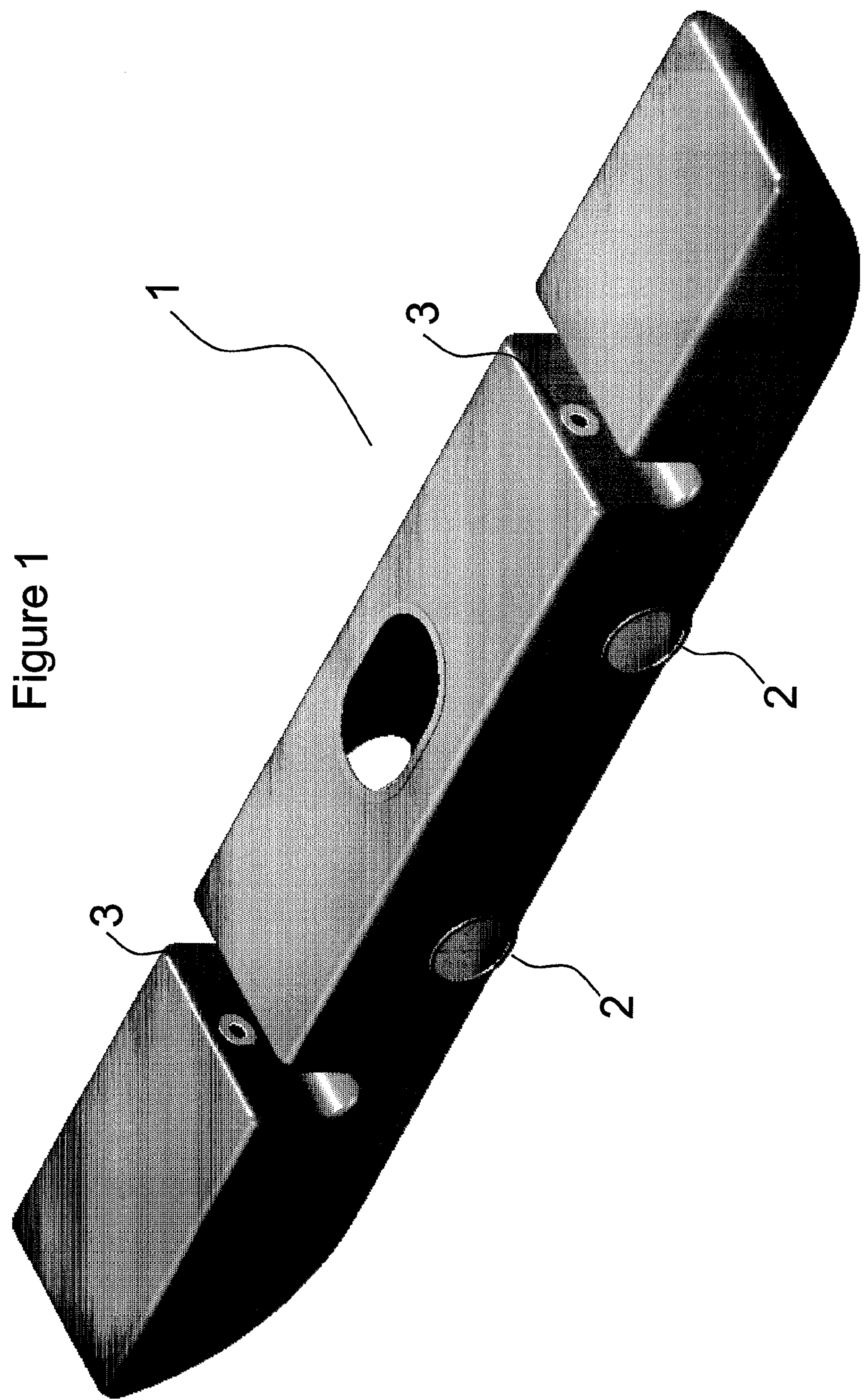
FIG. 1 shows an auxiliary fuel tank of the embodiment.

FIG. 1 shows an auxiliary tank 1 of the embodiment of the present invention. The fuel tank is shaped to fit in floor cavities of an aircraft and is provided with interconnect fittings 2 to enable a number of such fuel tanks to be connected together. Vent fittings 3 are provided in the top of the fuel tank such that air is vented from the tank to ensure complete filling, the vent connections also act as overflow outlets for each tank.

Figure 2:
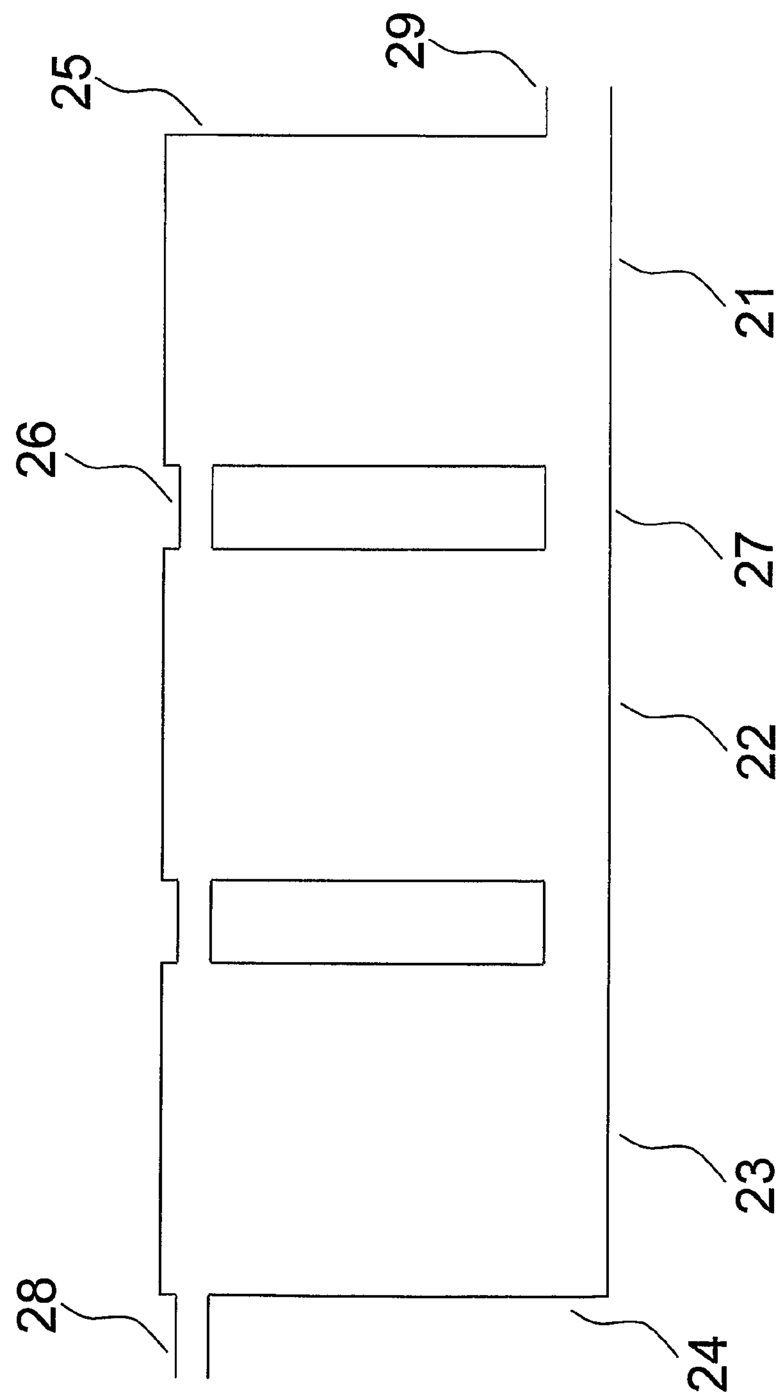
FIG. 2 shows three auxiliary fuel tanks connected together according to the embodiment.

An auxiliary fuel tank system according to the embodiment of the invention consists of a number of individual tanks connected together via their interconnect and vent fittings. One of the vent fittings is an overflow for the auxiliary fuel tank system and is configured such that fuel only flows out of that overflow when the auxiliary tank system is full. FIG. 2 shows auxiliary fuel tanks according to the present embodiment.

The present embodiment utilises three fuel tanks 21, 22, 23 connected in a series arrangement. A first tank 21 has one of its interconnect fittings 29 connected to the fuel system of the aircraft to allow fuel to be pumped into, or out of, the auxiliary fuel tank system. Other interconnect fittings of the first tank 21 are connected 27 to the interconnect fittings of a second tank 22, which tank is also connected to a third tank 23. Any interconnect fittings of the third tank not utilised for connection to the second tank are closed 24.

The vent fittings of the first tank 21 are connected 26 to the vent fittings of the second tank 22, with any unused fittings of the first tank being closed 25. The vent fittings of the second tank are connected to the vent fittings of the third tank 23. Vent fittings of the third tank form an overflow and are connected 28 to a vent system of the aircraft, as described below. This connection system ensures that fuel can only flow out of the overflow when all auxiliary fuel tanks in the system are full. In the system of FIG. 2, all of the tanks will fill to the bottom of their vent connection before any fuel flows out of the overflow 28.

Other systems of auxiliary fuel tanks are also possible, and it is also possible to use a single large auxiliary tank as opposed to the plurality of smaller tanks described above.

Figure 3:
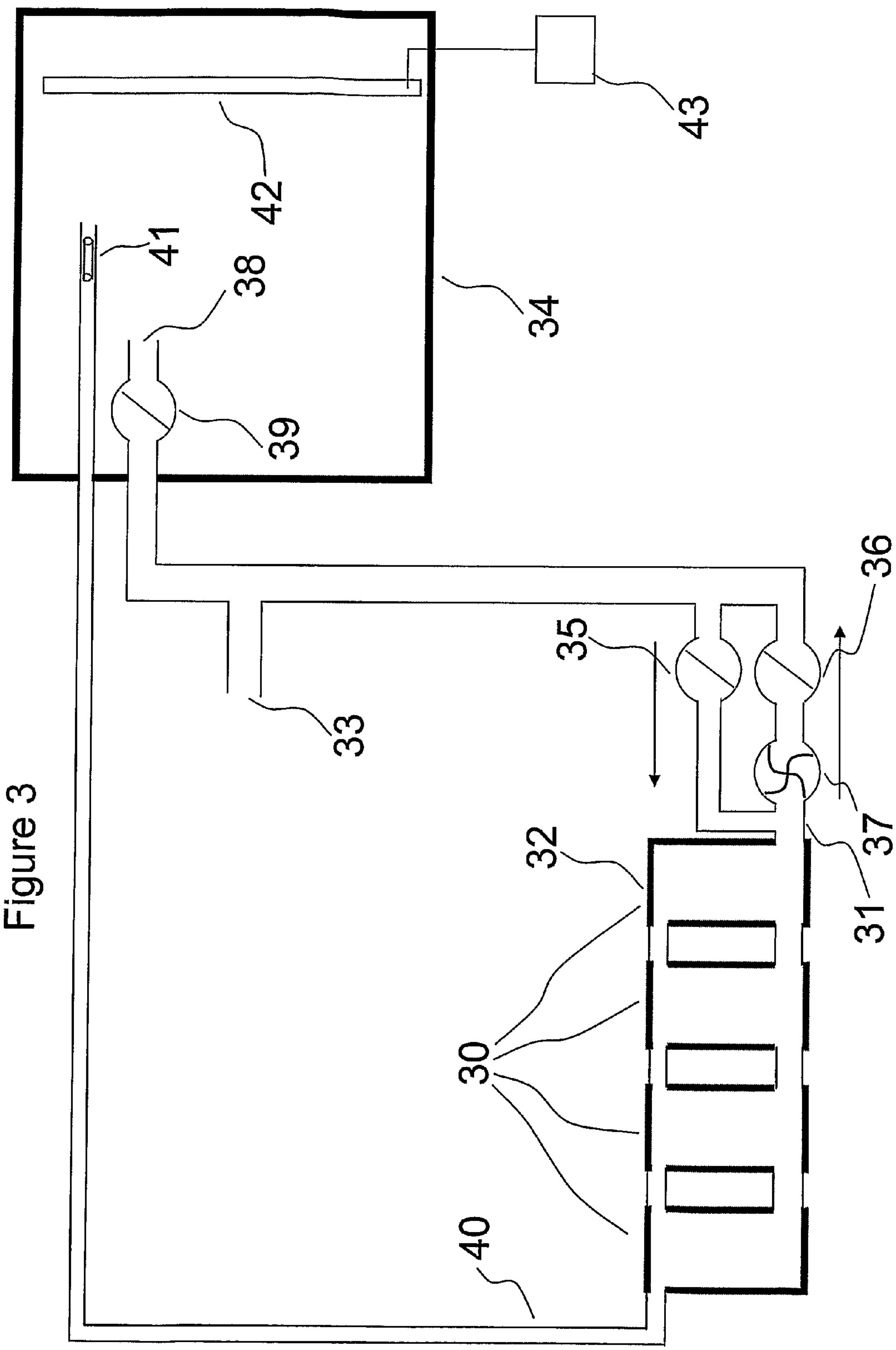
FIG. 3 is a diagram of a fuel system according to the embodiment.

FIG. 3 shows a schematic diagram of a fuel system according to the embodiment of the present invention. Auxiliary fuel tanks 30 are connected as described above with reference to FIG. 2. The interconnect port 31 of the first auxiliary fuel tank 32 is connected to the refuel gallery 33 and the main tank 34, via a refuelling valve 35 and, in parallel, via an outlet valve 36 and a fuel pump 37. The inlet 38 to the main tank 34 is equipped with a valve 39. The overflow 40 of the auxiliary fuel tanks (a vent connection of the last auxiliary fuel tank) is connected to the main fuel tank whereby fuel can flow through the overflow into the main tank. The outlet into the main tank is equipped with a flow detector 41.

The main tank has a fuel gauge 42 which is connected to the avionics systems 43 of the aircraft to allow accurate monitoring and display of the quantity of fuel in the main tank. The auxiliary fuel tanks have a total capacity of approximately 4,000 liters, while the main fuel tanks have a capacity of approximately 60,000 liters.

The method, according to the present embodiment, of operating an aircraft with a fuel system as described above will now be described with reference to FIG. 4. The method of the embodiment utilises the use of a fuel quantity gauging system implemented in software in the aircrafts computer systems (not shown).

If a flight does not require more fuel than can be stored in the main fuel tanks, then fuel is only placed into those main fuel tanks 50. During a flight not using auxiliary fuel tanks fuel is consumed from the main tanks and the fuel quantity is indicated based on the main tank fuel gauges 51.

If auxiliary tanks are required then refuelling begins by opening 53 the auxiliary tank refuel valve 35 and closing 54 the main fuel tank valve 39 such that fuel pumped into the refuelling gallery 33 passes into the auxiliary tanks. Fuel is pumped 55 into the aircraft and the auxiliary fuel tanks will fill with fuel, until a level is reached where fuel flows out of the overflow 40 and into the main tanks 34. This indicates that there is a known quantity of fuel in the auxiliary tanks and is indicated by fuel flow being detected by indicator 41. When such flow is detected 56 the auxiliary tank refuel valve 35 is closed 57 and the main tank refuel valve 39 is opened 58 such that fuel passes into the main tanks.

The total fuel load of the aircraft during filling of the main tanks is the quantity in the auxiliary tanks (which is known since they are full) plus the quantity of fuel in the main tanks which is known accurately by the indication of the gauge 42. Refuelling continues until the quantity of fuel in the aircraft is equal to the required fuel load 59.

Operation of an aircraft using the auxiliary fuel tanks is split into two phases. At the start of the first phase valves 36 and 39 are opened 60 and fuel pump 37 is operated 61. Operation of pump 37 is controlled by the main fuel tank gauge such that the main tanks are kept full 62. Maintenance of the level of fuel in the main fuel tanks by pumping fuel from the auxiliary tanks to the main tanks continues while fuel is consumed by the Auxiliary Power Unit (APU) and/or engines, throughout the first phase.

The quantity of fuel remaining in the main tanks during aircraft operation is known from the fuel gauge in those tanks, and is therefore known to a high degree of accuracy. The rate of fuel consumption is monitored by aircraft avionics systems in a conventional manner, which utilises a plurality of fuel flow meters located in the fuel system of the aircraft. By integrating the fuel consumption rate over time that rate is used to provide an indication of the amount of fuel consumed. The quantity of fuel in the auxiliary tanks at the start of the flight is known and the quantity of fuel remaining in the auxiliary tanks is calculated by subtracting the consumed fuel quantity from that initial quantity. While fuel remains in the auxiliary fuel tanks, the total remaining fuel quantity is calculated as $Q_{aux\_start}+Q_{main\_ind}-\text{integral}\ (C_{engine}+C_{APU})$. Where, $Q_{aux\_start}$=Fuel quantity in auxiliary tanks before the start of consumption, $Q_{main\_ind}$=Fuel quantity in main tanks, as indicated by the main tank gauges, $C_{engine}$=Consumption rate of engines and $C_{APU}$=Consumption rate of APU. The fuel remaining in the auxiliary tanks is equal to the total fuel quantity, minus the indicated level in the main tanks.

During refuelling the auxiliary fuel tanks are filled until an overflow is detected and so the quantity of fuel in the auxiliary tanks at the start of the first phase is defined by the configuration of the auxiliary tanks. That quantity is stored in the aircraft avionic systems. Alternatively the quantity can be entered into the system by the aircraft operator once refuelling has been completed.

During this first phase of fuel consumption the total remaining quantity of fuel is only known by an indirect measure since the fuel quantity in the auxiliary tanks is calculated from the rate of fuel consumption and the initial quantity of fuel in the auxiliary tanks. The quantity of fuel in the auxiliary fuel tanks is therefore considered a low-integrity measurement, with a mean time to failure of $1\times10^4$ hours. However, the level of fuel in the main tanks is known to a high integrity (as it is indicated directly by the fuel gauges) and so there is a reliable measure of the minimum amount of fuel on board even if there is an error in the calculations and the auxiliary fuel tanks are empty. By emptying the auxiliary fuel tanks while maintaining a known quantity in the main fuel tanks a high-integrity indication of the quantity of fuel in the auxiliary fuel tanks is not required as the minimum quantity of fuel on board is known to a high integrity, thereby allowing safe flight completion.

The consumption of all of the fuel in the auxiliary fuel tanks is detected by sensing that the rate of change of fuel in the main tanks has become equal to the consumption rate. When it is detected 63 that the auxiliary fuel tanks are empty valves 36 and 39 are closed 64 and pump 37 is turned off 65. This terminates the first phase, and flight then continues in a second phase, using the fuel in the main tanks. During this second phase of fuel consumption the quantity of remaining fuel is known accurately from the fuel gauges in the main tanks, therefore allowing safe flight completion 66.

When the auxiliary fuel tanks are empty, the indicated fuel quantity switches from being based on the fuel consumption rate, to being a direct measure taken from the main fuel tank gauges. Since the quantity calculated from the consumption rate is an approximation it is likely that there will be a step change in the quantity of fuel indicated when the basis of the indication changes.

The fuel quantity display includes an indication of the source of the data. When the quantity displayed is derived only from the main tank fuel gauges the fuel quantity is displayed in green to indicate that it is a high-integrity reading. If the displayed quantity is derived from the main tank gauges plus the estimated quantity of fuel in the auxiliary tanks then the display is in amber, to indicate that it is a low integrity reading. The pilot also has access to a fuel page on the CDS (Cockpit Display System) where the statuses of fuel tanks are shown. Hence at the start of the flight when a low integrity total fuel quantity is displayed, the pilot can see that each of the main tanks still have high integrity measured quantities, whereas the auxiliary tanks have a low integrity calculated quantity. Again, these status indications are coloured green for high integrity and amber for low integrity. Other systems to display the source of the quantity of fuel are also possible.

Whilst the present invention has been described and illustrated with reference to particular embodiments, it will be appreciated by those of ordinary skill in the art that the invention lends itself to many different variations not specifically illustrated herein. By way of example, certain variations to the above-described embodiments will now be described.

The embodiment described above estimates the quantity of fuel consumed by the consumption rate of the engines and APU, but it is also possible to estimate the fuel remaining in the auxiliary fuel tanks by measuring the volume of fuel pumped out of the fuel tanks. Furthermore a combination of methods can be used to improve the reliability of the detection.

In the embodiment described the consumption of all of the fuel in the auxiliary fuel tanks is indicated by the consumption rate matching the rate of change of the main tank volume. The auxiliary fuel tanks being empty, and hence the end of the first phase, can also be detected by the indication of a low pressure at pump 37, or a combination of both techniques.

The embodiment of the invention keeps the main fuel tanks full while there is fuel in the auxiliary fuel tanks, but the main tanks could be maintained at any level as opposed to being kept full. The fuel tanks should be maintained at a sufficiently high level that they will always hold enough fuel for the aircraft to land safely in the event that the indicated quantity in the auxiliary fuel tanks is incorrect.

Depending on the configuration of the aircraft the calculation and display of fuel quantities may be performed by the aircraft avionics systems, by a fuel quantity display apparatus forming part of the aircraft avionics systems or by a dedicated fuel quantity display apparatus. The main tank fuel gauges and fuel consumption rate indicators are connected to the appropriate apparatus, dependent upon the apparatus performing the calculation and display.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. A method of aircraft operation, comprising the steps of:

(a) providing one or more main fuel tanks in which fuel is stored, said one or more main fuel tanks being provided with one or more fuel gauges arranged to provide a measure of the amount of fuel in said one or more main fuel tanks, (b) providing one or more auxiliary fuel tanks in which fuel is stored, (c) the aircraft using fuel during a first phase of fuel consumption, said one or more auxiliary fuel tanks holding fuel upon commencement of the first phase, and said one or more auxiliary fuel tanks being substantially empty of fuel immediately after the first phase, (d) during the first phase of fuel consumption, providing an indication of the amount of fuel carried by the aircraft by means of summing (i) the amount of fuel in said one or more main fuel tanks as measured by said one or more fuel gauges and (ii) the amount of fuel remaining in said one or more auxiliary fuel tanks as calculated using a measure relating to the fuel consumption rate, wherein during the first phase fuel is pumped from the one or more auxiliary fuel tanks to the one or more main fuel tanks to maintain the quantity of fuel in the one or more main fuel tanks at a particular level, (e) the aircraft using fuel during a second phase of fuel consumption, the second phase commencing immediately after the end of the first phase, said one or more auxiliary fuel tanks remaining substantially empty of fuel during the second phase of fuel consumption, and (f) during the second phase of fuel consumption, providing an indication of the amount of fuel carried by the aircraft, the indication being based on the amount of fuel measured by said one or more fuel gauges.

2. A method of aircraft operation according to claim 1, wherein the auxiliary fuel tanks are full prior to commencement of the first phase.

3. A method of aircraft operation according to claim 2, wherein the method includes a step of detecting when the auxiliary fuel tanks are full by means of detecting the presence or absence of fuel in an overflow outlet associated with those auxiliary fuel tanks.

4. A method of aircraft operation according to claim 1, wherein the method includes a step of detecting when the auxiliary fuel tanks are empty by detecting low pressure at a fuel pump pumping fuel from the auxiliary tanks.

5. A method of aircraft operation according to claim 1, wherein the method includes a step of detecting when the auxiliary fuel tanks are empty by monitoring the fuel consumption rate and the rate of change of fuel quantity in the main tanks.

6. A method of aircraft operation according to claim 1, wherein the fuel remaining in the auxiliary fuel tanks is determined by subtracting the integral of the fuel consumption rate from the quantity of fuel in the auxiliary fuel tanks at the start of the first phase.

7. A fuel quantity indication method, comprising the steps of during a first phase of aircraft operation, during which phase fuel is held in at least one ungauged fuel tank and at least one gauged fuel tank, calculating the remaining fuel quantity in the at least one ungauged fuel tank by subtracting the integral of the fuel consumption rate from the quantity of fuel in the at least one ungauged tank at the start of the first phase and adding the quantity of fuel in the gauged fuel tank as indicated by the fuel gauges, and displaying the remaining fuel quantity accordingly, during a second phase of aircraft operation, during which phase fuel is only held in gauged fuel tanks, calculating the amount of remaining fuel according to the quantity of fuel indicated by the fuel gauges and displaying the remaining fuel quantity accordingly.

8. A computer system comprising a processor and a memory, the memory storing computer-implemented instructions arranged to calculate the amount of fuel carried by an aircraft, during a first phase, while one or more auxiliary fuel tanks hold fuel, wherein during the first phase fuel is pumped from the one or more auxiliary fuel tanks to one or more main fuel tanks to maintain the quantity of fuel in the one or more main fuel tanks at a particular level, the amount of fuel being calculated by means of summing (i) the amount of fuel represented by a first input to the computer system concerning the amount of fuel in the one or more main fuel tanks as measured by one or more fuel gauges and (ii) the amount of fuel in the one or more auxiliary fuel tanks as calculated using a previous measure of the amount of fuel in the auxiliary fuel tanks and a second input to the computer system representing the rate of fuel consumption, during a second phase of fuel consumption, the second phase commencing immediately after the end of the first phase, said one or more auxiliary fuel tanks remaining substantially empty of fuel during the second phase of fuel consumption, and during the second phase of fuel consumption, providing an indication of the amount of fuel carried by the aircraft, the indication being based on the amount of fuel measured by said one or more fuel gauges.

9. An aircraft fuel tank assembly, comprising:

at least one auxiliary fuel tank, at least one main fuel tank having one or more fuel gauges, and a fuel quantity display apparatus, the assembly being so arranged that while said one or more auxiliary tanks hold fuel, the fuel quantity display apparatus provides an indication of the amount of fuel carried by the aircraft in dependence on the sum of (i) the amount of fuel in said one or more main fuel tanks as measured by said one or more fuel gauges and (ii) the amount of fuel remaining in said one or more auxiliary fuel tanks as calculated using a measure relating to the fuel consumption rate, wherein during a first phase of fuel consumption fuel is pumped from the at least one auxiliary fuel tank to the at least one main fuel tank to maintain the quantity of fuel in the at least one main fuel tank at a particular level, and while said one or more auxiliary fuel tanks are substantially empty, the fuel quantity display apparatus provides an indication of the amount of fuel carried by the aircraft based on the amount of fuel measured by said one or more fuel gauges.

10. An aircraft having an aircraft fuel tank assembly according to claim 9.

11. A non-transitory computer-readable medium having computer-executable instructions that calculate the amount of fuel carried by an aircraft, comprising:

(a) calculating and outputting a fuel quantity parameter, which represents the amount of fuel remaining during a first phase while one or more auxiliary fuel tanks hold fuel, wherein during the first phase fuel is pumped from the one or more auxiliary fuel tanks to one or more main fuel tanks to maintain the quantity of fuel in the one or more main fuel tanks at a particular level, by means of summing (i) a first parameter concerning the amount of fuel in the one or more main fuel tanks as measured by one or more fuel gauges and (ii) a second parameter concerning the amount of fuel in the one or more auxiliary fuel tanks, and (b) calculating the second parameter using a previous measure of the amount of fuel in the auxiliary fuel tanks and a third parameter concerning the rate of fuel consumption, (c) calculating and outputting a fuel quantity parameter, which represents the amount of fuel remaining during a second phase of fuel consumption, the second phase commencing immediately after the end of the first phase, said one or more auxiliary fuel tanks remaining substantially empty of fuel during the second phase of fuel consumption, and during the second phase of fuel consumption, providing an indication of the amount of fuel carried by the aircraft, the indication being based on the amount of fuel measured by said one or more fuel gauges.

* * * * *